United States Patent
Park et al.

(12) 
(10) Patent No.: US 6,692,093 B1
(45) Date of Patent: Feb. 17, 2004

(54) DEVICE FOR ADJUSTING MOUNTING ANGLE OF LCD FOR REFRIGERATOR

(75) Inventors: Jin Koo Park, Seoul (KR); Sang Ho Seo, Kyonggi-do (KR); Young Hoon Roh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/709,548

(22) Filed: Nov. 13, 2000

(30) Foreign Application Priority Data

Feb. 1, 2000 (KR) .......................................... 2000-4892
Feb. 1, 2000 (KR) .......................................... 2000-4893

(51) Int. Cl.[7] .............................................. A47B 96/04
(52) U.S. Cl. ................. 312/405.1; 312/319.7; 62/125; 74/89.14; 74/89.23; 74/105; 74/424.95
(58) Field of Search ................. 312/401, 405, 312/406, 405.1, 319.5, 319.6, 319.7; 62/125, 126, 123, 128, 129, 130, 131; 236/94; 74/89.14, 89.23, 424.95, 105

(56) References Cited

U.S. PATENT DOCUMENTS

| | | | | |
|---|---|---|---|---|
| 4,490,986 A | * | 1/1985 | Paddock .................... | 62/127 |
| 4,936,106 A | * | 6/1990 | Beach, Jr. et al. ............ | 62/131 |
| 5,862,468 A | * | 1/1999 | Kim ........................... | 455/321 |
| 5,873,200 A | * | 2/1999 | Henderson ............. | 74/89.15 X |
| 5,901,564 A | * | 5/1999 | Comeau, II ............... | 62/264 |
| 6,012,785 A | * | 1/2000 | Kawasaki ............. | 312/319.7 X |
| 6,086,232 A | * | 7/2000 | Schulze et al. ......... | 74/89.14 X |
| 6,098,411 A | * | 8/2000 | Jeon .......................... | 62/125 |
| 6,101,819 A | * | 8/2000 | Onaka et al. ................. | 62/125 |
| 6,125,028 A | * | 9/2000 | Matsumoto ............ | 312/319.5 X |
| 6,216,479 B1 | * | 4/2001 | Elwood ..................... | 62/126 X |

FOREIGN PATENT DOCUMENTS

| | | | | |
|---|---|---|---|---|
| DE | 3330587 | * | 3/1985 | |
| DE | 34 04 256 A1 | | 8/1985 | |
| DE | 35 20 272 A1 | | 12/1986 | |
| DE | G 94 16 709.5 | | 12/1994 | |
| DE | 195 05 830 A1 | | 8/1995 | |
| JP | 54039256 | * | 3/1979 | .................. 62/125 |
| JP | 2059787 | | 2/1990 | |
| JP | 3-85585 A | | 4/1991 | |
| JP | 4-16496 U | | 2/1992 | |
| JP | 05149670 | * | 6/1993 | .................. 62/125 |
| JP | 5-204863 A | | 8/1993 | |
| JP | 05264162 | * | 10/1993 | .................. 62/127 |
| JP | 6048254 | | 2/1994 | |
| JP | 8-99399 A | | 4/1996 | |
| JP | 9250868 | | 9/1997 | |
| JP | 10-9753 A | | 1/1998 | |
| JP | 10019451 | * | 1/1998 | |
| JP | 11-338374 A | | 12/1999 | |
| JP | 2000275612 | * | 10/2000 | |
| JP | 2001324258 | * | 11/2001 | |

* cited by examiner

*Primary Examiner*—Lanna Mai
*Assistant Examiner*—Hanh V. Tran
(74) *Attorney, Agent, or Firm*—Birch, Stewart, Kolasch & Birch, LLP (57) ABSTRACT

Device for adjusting a mounting angle of an LCD for a refrigerator including an LCD rotatably mounted on a front surface of a door of a refrigerator by a hinge, and mounting angle adjusting means in rear of the LCD for rotating the LCD to an angle centered on the hinge shaft, thereby permitting the user to watch the most clear image, and improving a freedom of design.

10 Claims, 9 Drawing Sheets

DEVICE FOR ADJUSTING MOUNTING ANGLE OF LCD FOR REFRIGERATOR

BACKGROUND OF THE INVENTION

1. Field of the Invention

The present invention relates to a device for adjusting amounting angle of an LCD for a refrigerator, and more particularly, to a device for adjusting a mounting angle of an LCD (Liquid Crystal Display), in which a tilting angle of the LCD with respect to a door of the refrigerator is adjusted, for improving a convenience of use.

2. Background of the Related Art

In displays employed as data output devices for computers, there are Braun tubes using electron guns, the LCD, PDP(Plasma Display Panel), and the like. And, it is recent trend that the displays are mounted, not only to the computers, but also to various electric appliances, such as refrigerators, cookers, and the like, for displaying information of their own and others.

Figure 1:
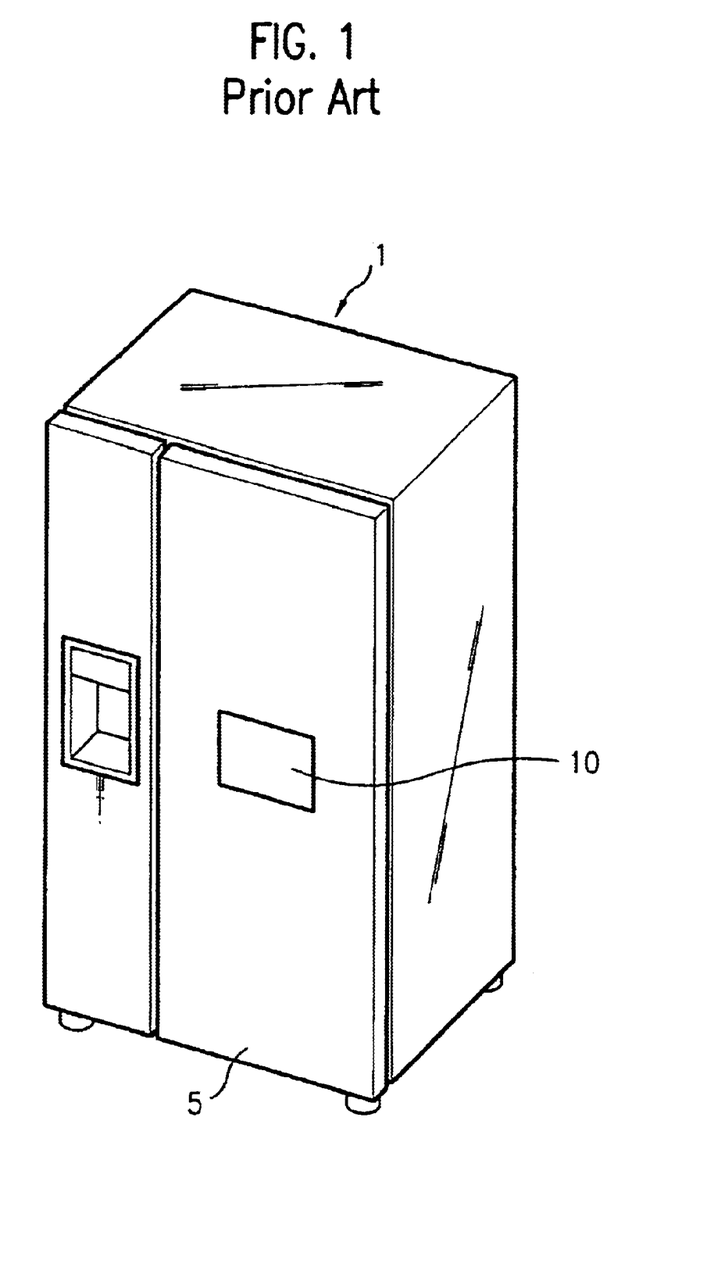
FIG. 1 illustrates a perspective view of a related art refrigerator having an LCD provided thereto.

In the meantime, recently, use of the LCD and the like which are thin is increased as the Braun tube has a limitation in reduction of the thickness, though the Braun tube is a display used the most widely up to now. Particularly, in a case display used in the electric appliance, use of a thin display, such as the LCD, is actually essential owing to a limitation coming from mounting conditions. For example, as shown in FIG. 1, recently, a refrigerator 1 is suggested, in which the LCD 10 is mounted on a door 5 of the refrigerator 1, for displaying various information, such as operational states of the refrigerator. However, the related art LCD mounted on an electric appliance, such as the refrigerator, has the following problems.

First, it has been impossible to adjust a mounting angle of the related art LCD as the user likes. However, there are cases when an image on the LCD is invisible depending on an angle of view to the LCD in light of characteristics of the LCD, as the LCD is thin and provides the best clear view when the LCD is seen substantially vertical to the screen. Though the LCD may be mounted to fit to a field of view of the user for solving such a problem, actually it is not possible the LCD is mounted to fit to fields of views of all users who have different bodily conditions. And, depending on the electric appliances, there are many cases when a mounting position of the LCD is limited.

Second, in a case an input device is provided to the electric appliance, together with the LCD, an output device, a touch panel is used, generally. In this instance, since the touch panel is fitted to a top surface of the LCD in general, the mounting angle of the LCD can not be adjusted, with reduction of convenience of use similar to the foregoing case.

SUMMARY OF THE INVENTION

Accordingly, the present invention is directed to a device for adjusting a mounting angle of an LCD for a refrigerator that substantially obviates one or more of the problems due to limitations and disadvantages of the related art.

An object of the present invention is to provide a device for adjusting a mounting angle of an LCD for a refrigerator, in which a mounting angle of an LCD is adjustable for providing the best clear view to a user.

Another object of the present invention is to provide a device for adjusting a mounting angle of an LCD for a refrigerator, which can maximize a convenience of use.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for adjusting a mounting angle of an LCD for a refrigerator including an LCD rotatably mounted on a front surface of a door of a refrigerator by a hinge, and mounting angle adjusting means in rear of the LCD for rotating the LCD to an angle centered on the hinge shaft.

The mounting angle adjusting means includes a motor mounted to a back surface of the door, and movement conversion means coupled between the LCD and the motor for converting a rotating movement into a linear movement.

In other aspect of the present invention, the mounting angle adjusting means includes a motor mounted on a rear surface of the door, movement conversion means for converting the rotating movement of the motor into the linear movement, and supplementary movement conversion means provided between the movement conversion means and the LCD for converting a linear movement into a rotating movement.

In another aspect of the present invention, the mounting angle adjusting means includes elastic means fitted between the LCD and the rear of the door for storing an elastic force when the LCD is pulled forward, and a damper fitted between the LCD and the rear of the door for controlling discharge of the elastic force stored in the elastic means.

Accordingly, the present invention permits to adjust a mounting angle of the LCD.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 2:
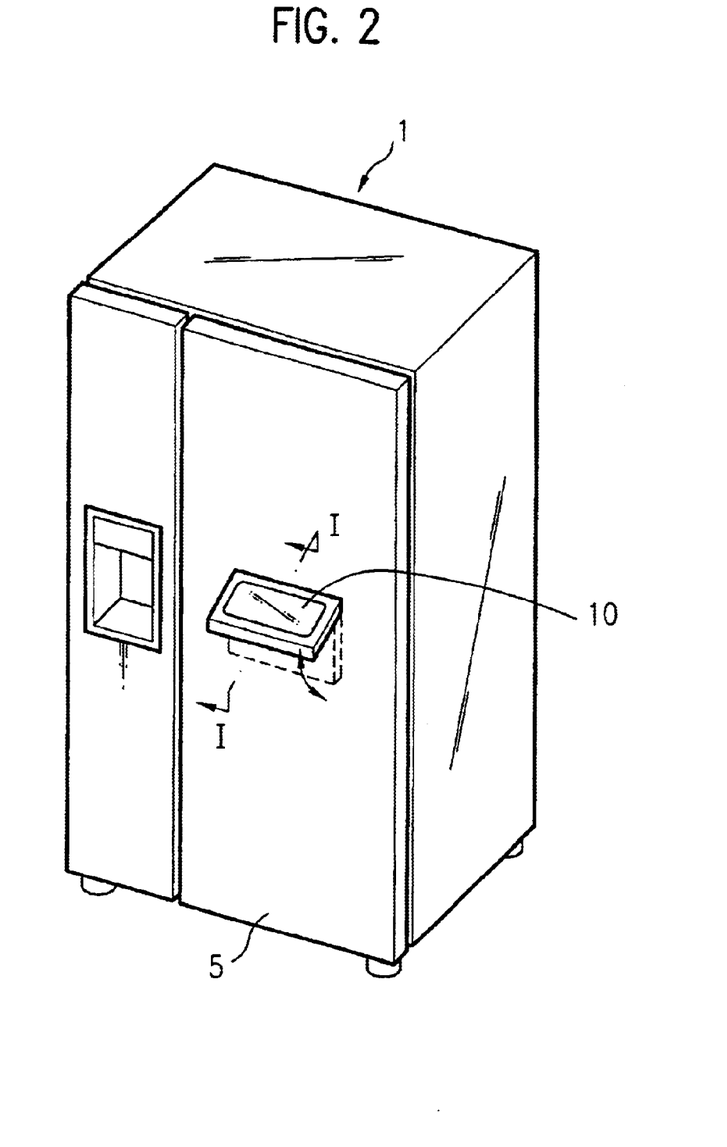
FIG. 2 illustrates a perspective view of a refrigerator having a device for adjusting a mounting angle of an LCD in accordance with a first preferred embodiment of the present invention applied thereto.
Figure 3:
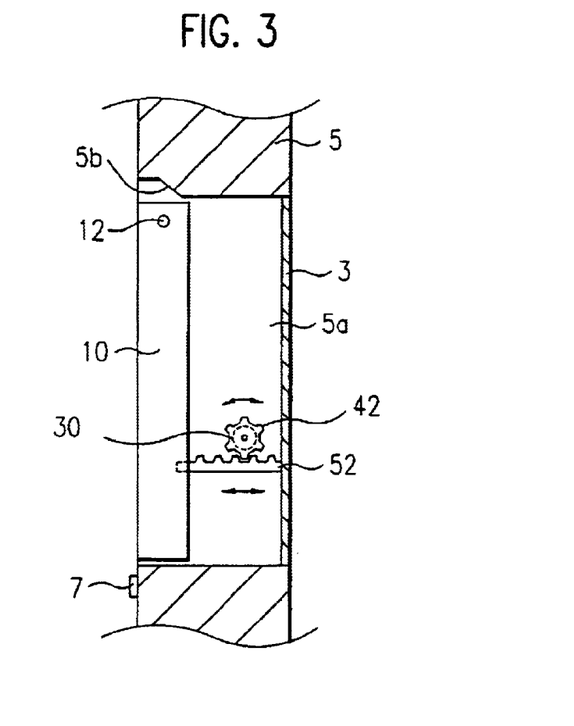
FIG. 3 illustrates a section across line I—I in FIG. 2.

Reference will now be made in detail to the preferred embodiments of the present invention, examples of which are illustrated in the accompanying drawings. For the sake of convenience, though a device for adjusting a mounting angle of an LCD for a refrigerator is explained in embodiments of the present invention, the present invention is not limited to this, but applicable to other electric devices. FIG. 2 illustrates a perspective view of a refrigerator having a device for adjusting a mounting angle of an LCD in accordance with a first preferred embodiment of the present invention applied thereto, and FIG. 3 illustrates a section across line I—I in FIG. 2. The device for adjusting a mounting angle of an LCD in accordance with a first preferred embodiment of the present invention will be explained with reference to FIGS. 2 and 3.

There is an LCD 10 rotatably mounted to a front surface of a refrigerator door 5, and a device for adjusting a mounting angle of the LCD in rear of the LCD 10. In detail, there is a cavity 5a in the door 5, and the LCD is rotatably mounted centered on a shaft 12 in the cavity 5a. There is the device for adjusting a mounting angle in rear of the LCD 10, and a switch 7 for adjusting an angle of the LCD 10 on the door 5. And, it is preferable that there is a cover 3 in rear of the device for adjusting a mounting angle for separating the LCD 10 and the device for adjusting a mounting angle from an inner portion of the refrigerator. In the meantime, there is stopping part 5b in the door 5 above the cavity 5a, for preventing interference by the door 5 when the LCD 10 is rotated and stopping rotation of the LCD 10 more than a preset angle. The device for adjusting a mounting angle includes a motor 30 for generating a rotating force, and motion conversion means connected between the motor 30 and the LCD 10 for converting a rotating motion into a linear motion. Of course, the motor 30 is controlled by a separate control circuit, so that the user can control operation of the motor 30 by using the switch 7 on the door 5. There can be a variety of control circuits, which are well known, and detailed explanation of which will be omitted.

The motion conversion means will be explained. There is a driving gear, i.e., a pinion 42 coupled to a shaft of the motor 30, and a rack 52, a gear for converting a rotating motion into a linear motion, engaged to the pinion 42 having a fore end connected to the LCD 10. Axes of the pinion 42 and the rack 52 are parallel, and tooth traces of the pinion 42 and the rack 52 are straight lines, i.e., spur gear forms.

The operation of this embodiment will be explained.

When the user presses the switch 7, a signal from the switch 7 is provided to the control circuit, to control operation of the motor 30. That is, the motor 30 is made to rotate, to rotate the pinion 42 coupled to the motor 30. Then, the rack 52 engaged with the pinion 42 makes a linear motion, rotating the LCD 10 connected to the fore end of the rack 52 centered on the shaft 12. At the end, the LCD 10 is projected forward at a preset angle. If the user releases the switch 7 to stop the motor 30, the LCD 10 stops in a state the LCD 10 has a preset angle with respect to the door 5. It is liable that the LCD 10 returns to an original position again as the motor rotates in a reverse direction by its own weight or a force of the user when the user uses the touch panel. Because, as the axis of the pinion 42 and the rack 52 are parallel, the rack 52 moves backward if the LCD 10 is pushed, and the pinion 42 and the motor 30 reverse if the rack 52 moves backward. For preventing this, it is preferable that a brake(not shown) is provided for preventing idling of the motor.

Figure 4:
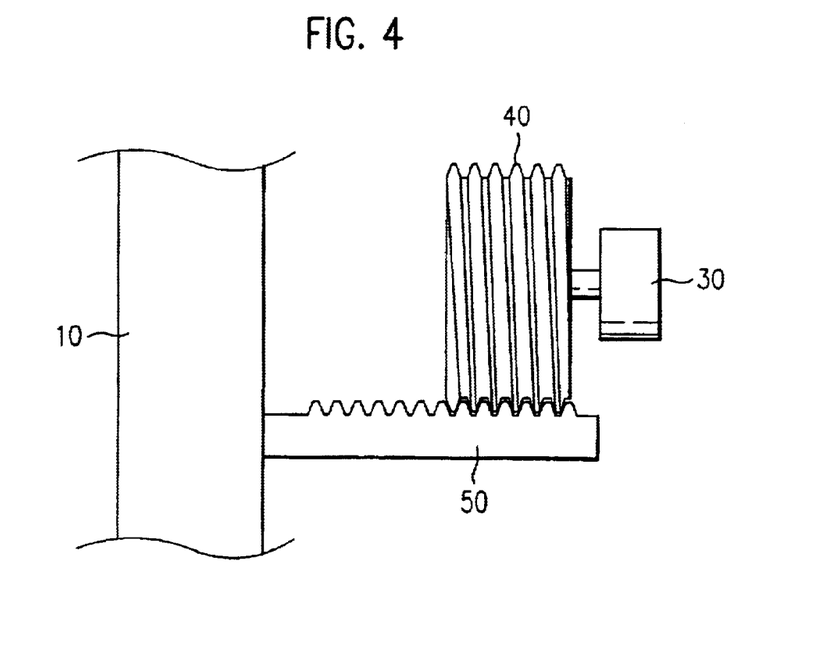
FIG. 4 illustrates a section of a device for adjusting a mounting angle of an LCD in accordance with a second preferred embodiment of the present invention, schematically.

Referring to FIG. 4, a device for adjusting a mounting angle of an LCD in accordance with a second preferred embodiment of the present invention will be explained, wherein components identical to the first embodiment will be given the same names and reference symbols and explanations of which will be omitted. The first embodiment requires the brake for preventing idling of the motor or movement of the rack by an external force during the motor is no in operation for fixing the LCD 10 at a required position. The second embodiment suggests a device for adjusting a mounting angle of an LCD which can preventing such a problem without using the brake. Similar to the first embodiment, the second embodiment device for adjusting a mounting angle of an LCD includes a driving gear 40 coupled to a shaft of the motor 30, a conversion gear 50 engaged with the driving gear 40 for converting a rotating motion into a linear motion, and an LCD 10 connected to a fore end of the conversion gear 50. However, it is preferable that the axes of the driving gear 40 and the conversion gear 50 of the present invention are crossed substantially, and tooth traces of respective gears are helical. That is, the driving gear is cylindrical and the conversion gear 50 is a rack of which pitch circle diameter is infinitive.

The operation of the second embodiment is similar to the first embodiment, and operation of which will be omitted. However, the second embodiment device permits to fix the LCD 10 at a desired angle as the idling of the motor 30 caused by an external force can be prevented without the brake. Because, though a backward force is also exerted on the conversion gear 50 connected to the LCD 10 if the LCD 10 is pushed backward, the conversion gear 50, engaged to the driving gear 40 substantially perpendicular to the driving gear 40, pushes the motor only in the axis direction of the motor through the driving gear 40, but not in a rotating direction, thereby preventing idling rotation of the motor 30.

A more preferred embodiment of the second embodiment will be explained with reference to FIGS. 5~7.

Figure 5:
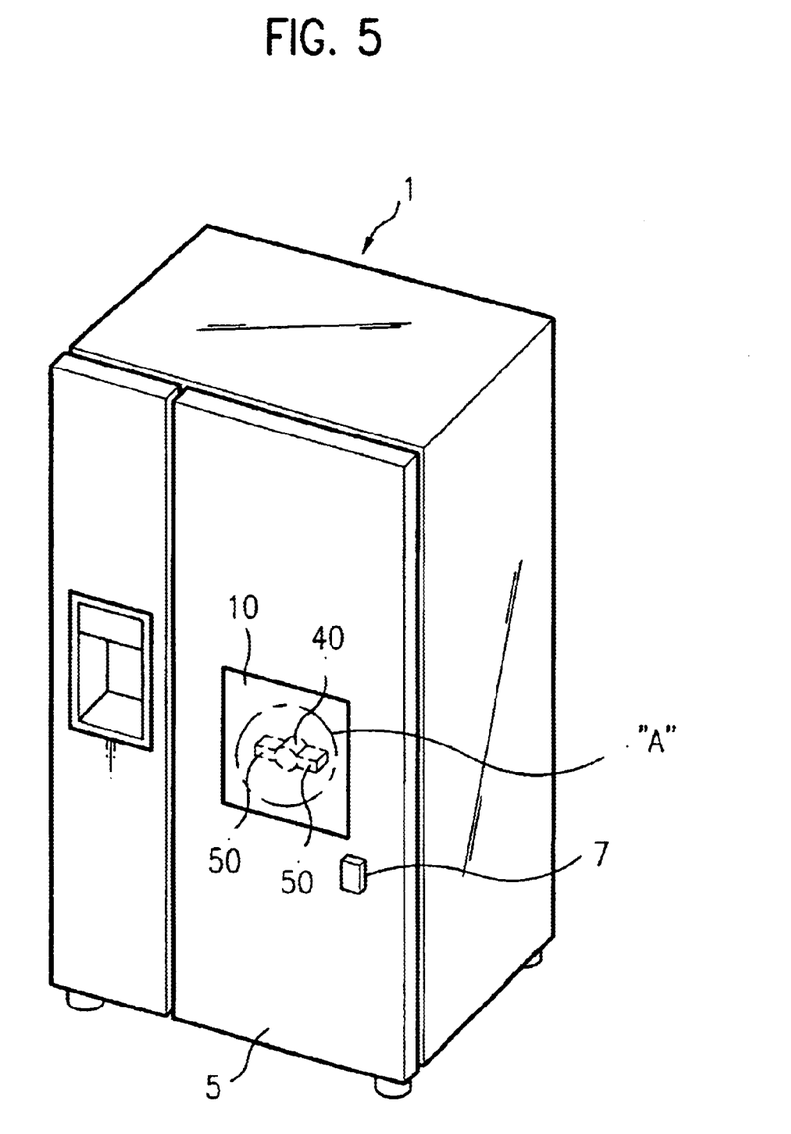
FIG. 5 illustrates a perspective view of a refrigerator having a device for adjusting a mounting angle of an LCD in accordance with a second preferred embodiment of the present invention applied thereto.

Referring to FIG. 5, it is preferable that the driving gear 40 has at least more than one conversion gear engaged thereto, because this arrangement permits a uniform distribution of force in comparison to a case when only one conversion gear 50 is used, which allows a smooth movement. And, as shown in FIG. 6, it is preferable that a tooth formed part 54 of the conversion gear 50 has a curvature identical to a curvature of the driving gear 40.

Figure 6:
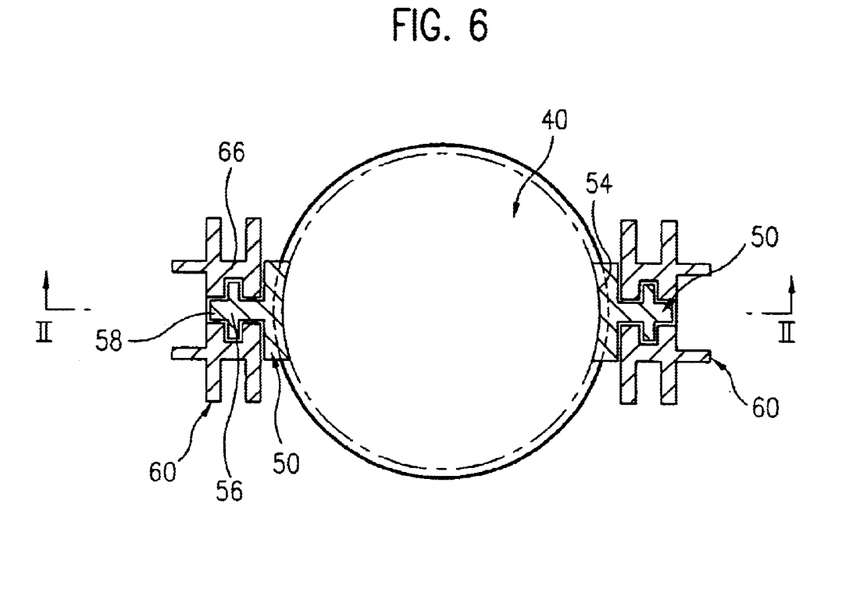
FIG. 6 illustrates a sectional enlarged view of "A" part in FIG. 5.
Figure 7:
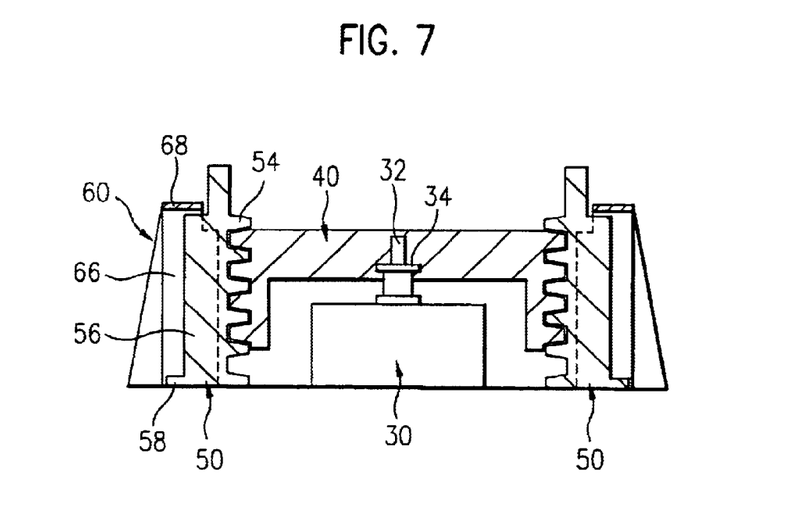
FIG. 7 illustrates a section across line II—II in FIG. 6.

In the meantime, as shown in FIGS. 6 and 7, it is preferable that the linear motion of the conversion gear 50 is guided by a guide member 60. In detail, there is a substantially "T" sectioned support 56 opposite to the tooth formed part 54, i.e., at a rear of the conversion gear 50, and the guide member 60 has a guide part 66 having a "T" section corresponding to the support 56 formed therein. And, it is preferable that the guide member 60 has a stopper 68 at a fore end thereof, and the conversion gear 50 has a projection 58 corresponding to the stopper 68. Because this arrangement permits an effective and easy prevention of tilting of the LCD 10 more than a required angle as the projection 58 is caught by the stopper 58 to stop proceeding of the projection 58 when the conversion gear 50 is projected to the maximum.

In the meantime, as shown in FIG. 7, it is preferable that the motor 30 is mounted in a recess formed inside of the driving gear 40 in the axis direction in view of space utilization. In this instance, it is preferable that a shaft 32 of motor 30 is coupled to the driving gear 40 by an O-ring 34.

Figure 8:
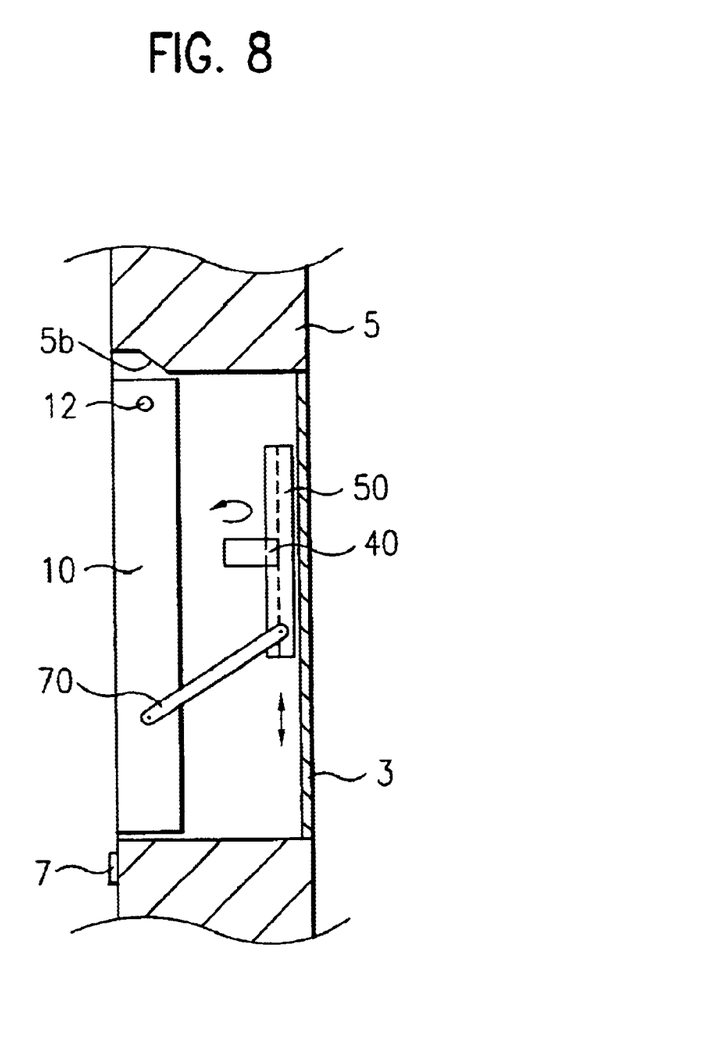
FIG. 8 illustrates a device for adjusting a mounting angle of an LCD in accordance with a third preferred embodiment of the present invention, schematically.

Next, a device for adjusting a mounting angle of an LCD in accordance with a third preferred embodiment of the present invention will be explained with reference to FIG. 8. In the forgoing embodiment, a length of the conversion gear 50 is dependent on an angle of movement of the LCD 10. A required minimum angle of the conversion gear 50 is an angle of movement of the LCD 10, more precisely, a horizontal distance corresponding to the angle of movement. However, in cases of providing the LCDs to electric appliances, there are many cases when there is a limit in a mounting space, particularly, in a thickness. Accordingly, the embodiment provides a device for adjusting a mounting angle of an LCD which permits an effective mounting of the LCD even if the mounting space is limited.

The device for adjusting a mounting angle of an LCD in accordance with a third preferred embodiment of the present invention will be explained with reference to FIG. 8.

Alike the second embodiment, the device for adjusting a mounting angle of an LCD in accordance with a third preferred embodiment of the present invention includes a motor(not shown) for generating a rotating force, a movement conversion means connected between the motor and the LCD 10 for converting a rotation angle of the motor into a linear movement. And, alike the second embodiment, the movement conversion means also has a driving gear 40 coupled to a shaft of the motor, and a conversion gear 50 engaged to the driving gear 40 for converting a rotating movement into a linear movement. However, in this embodiment, the conversion gear 50 is mounted in a vertical direction. This is because a mounting space of the device for adjusting a mounting angle of an LCD in the door 5 is limited with regard to a thickness, but not with regard to a vertical direction, i.e., in view of length. In the meantime, once the conversion gear 50 is mounted in a vertical direction, the LCD 10 can not be moved in a horizontal direction as the conversion gear 50 is moved in an up and down direction. Accordingly, this embodiment is provided with supplementary movement conversion means connected between the conversion gear 50 and the LCD 10 for conversion of the up and down movement of the conversion gear 50 into a horizontal movement. It is preferable that the supplementary movement conversion means has a link 70 with one end rotatably coupled to an fore end portion of the conversion gear, and the other end rotatably connected to the LCD 10, preferably to a lower end.

The operation of the device for adjusting a mounting angle of an LCD in accordance with a third preferred embodiment of the present invention will be explained. When the motor 30 is put into rotation, the driving gear 40 is rotated, to move the conversion gear 50 in a vertical direction, i.e., downward. Then, the link 70 connected to the conversion gear 50 pushes the LCD 10 such that the LCD 10 is projected to forward of the door 5 at an angle. Return of the LCD 10 can be made by an opposite process. According to this embodiment, the device for adjusting a mounting angle permits adjustment of a mounting angle of the LCD 10 even if the device is not mounted with the device projected from a rear surface of the door 5. This is because a length of the vertically mounted conversion gear 50 can be lengthened more as required.

Figure 9:
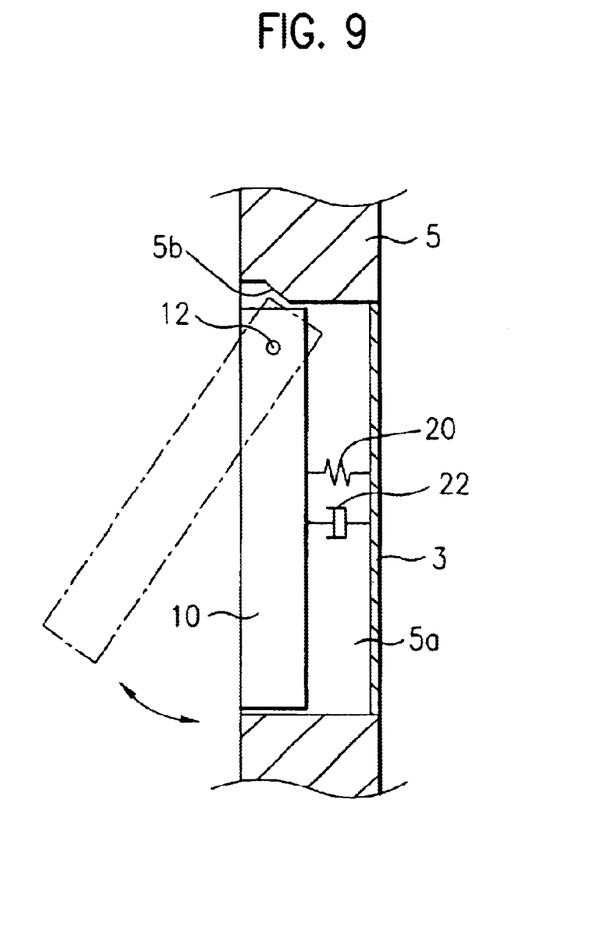
FIG. 9 illustrates a section of a device for adjusting a mounting angle of an LCD in accordance with a fourth preferred embodiment of the present invention, schematically.

A device for adjusting a mounting angle of an LCD in accordance with a fourth preferred embodiment of the present invention will be explained with reference to FIG. 9.

The device for adjusting a mounting angle of an LCD in accordance with a fourth preferred embodiment of the present invention includes elastic means 20, such as a coil spring, and a damper 22, both of which are coupled between a back surface of the LCD 10 and a back surface of the refrigerator door 5, i.e., a cover 3. The elastic means 20 stores an elastic force when the LCD 10 is drawn forward, and the damper 22 controls a returning speed of the LCD 10 when the LCD 10 is returned to an original position by the stored elastic force. Accordingly, when the user pulls the LCD 10 overcoming the elastic force of the elastic means 20, the LCD 10 rotates centered on the hinge shaft 12, so as to be projected forward of the door 5, when the elastic force is stored in the elastic means 20. When the user releases the LCD 10, the LCD 10 is going to return to the original position by the elastic energy stored in the elastic means 20. However, as the damper 22 controls the returning speed, the LCD 10 returns to the original position, very slowly. Therefore, the LCD 10 may be maintained to pose at an angle for a time period.

Figure 10:
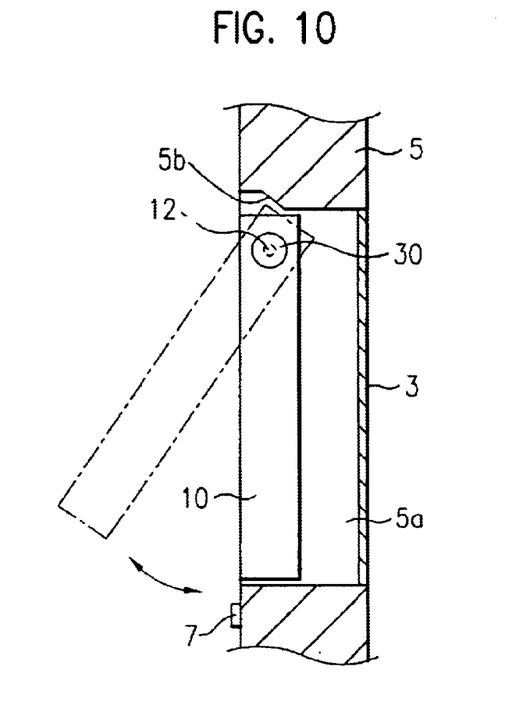
FIG. 10 illustrates a section of a device for adjusting a mounting angle of an LCD in accordance with a fifth preferred embodiment of the present invention, schematically.
Figure 11:
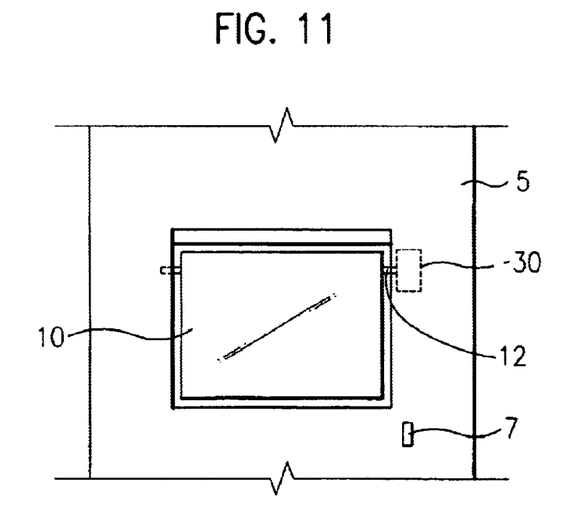
FIG. 11 illustrates a front view of FIG. 10.

The device for adjusting a mounting angle of an LCD in accordance with a fifth preferred embodiment of the present invention with reference to FIGS. 10 and 11.

The fifth embodiment device includes a small sized motor for rotating the LCD 10, directly. That is, there is a small sized motor 30 directly coupled to a hinge shaft 12 of the LCD 10, and there is an operation switch 7 on the door 5 for adjusting an angle of the LCD 10. Therefore, upon pressing the operation switch 7, the motor 30 rotates, together with the hinge shaft 12 coupled to the motor 30, to project the LCD 10 forward, at the end. When the operation switch 7 is released, to stop the motor 30, the LCD 10 stops in a state at an angle to the door 5. In order to prevent the LCD 10 from returning to the original position by a force of its own weight or exerted when the user uses a touch panel, a brake (not shown) may be provided.

Figure 12:
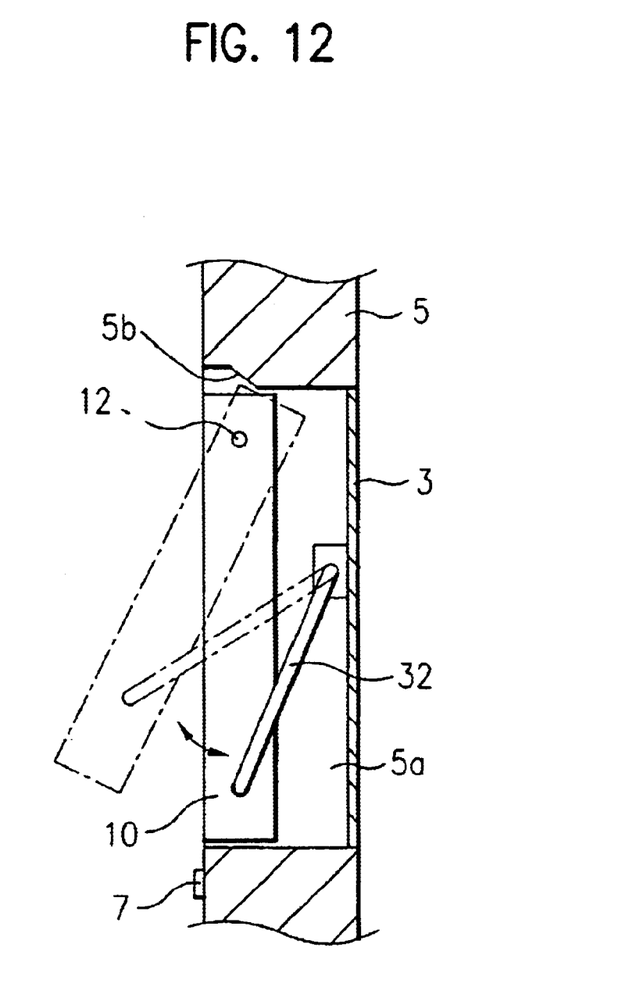
FIG. 12 illustrates a section of a device for adjusting a mounting angle of an LCD in accordance with a sixth preferred embodiment of the present invention, schematically.

The device for adjusting a mounting angle of an LCD in accordance with a sixth preferred embodiment of the present invention will be explained with reference to FIG. 12.

In the fifth embodiment, the motor 30 is directly connected to a hinge shaft 12 of the LCD 10. Therefore, the motor 30 is required to have a comparatively high torque, and mounting of the motor 30 is difficult. In this embodiment, the problem is resolved, to provide the motor 30 on a rear surface of the door 5, fore example, on the cover 3, and movement transmission means is provided between the motor 30 and the LCD 10. In detail, the LCD 10 is mounted in the door 5 so as to be rotated centered on the hinge shaft 12, and the motor 30 is mounted on the cover 3. The movement transmission means is provided between the LCD 10 and the motor 30. That is, one end of a link 32, the movement transmission means, is fixed to the shaft of the motor 30, and the other end of the link 32 is rotatably coupled to the LCD 10, preferably, to a lower portion thereof. Therefore, when the user presses the operation switch 7, the motor 30 is rotated. Then, the link 32 coupled to the shaft of the motor 30 is rotated. That is, a fore end of the link 32 connected to the LCD 10 is rotated centered on the shaft of the motor 30, to rotate the LCD 10 connected to the link 32 centered on the hinge shaft 12. This sixth embodiment device has an advantage compared to the fifth embodiment in that a small sized motor 30 can be used compared to the fifth embodiment in which the motor 30 is directly connected to the LCD 10, since the motor 30 and the LCD 10 are connected by the link 32.

As has been explained, the device for adjusting a mounting angle of an LCD has the following advantages.

First, as the mounting angle can be adjusted as the user like, the user can watch the most clear image.

Second, a convenience can be enhanced even a mounting angle of a touch panel can also be adjusted if one is provided as an input device.

Third, putting electric appliances on any convenient places is permitted as the mounting angle of the LCD can be adjusted as the user likes, that improves freedom of design.

It will be apparent to those skilled in the art that various modifications and variations can be made in the device for adjusting a mounting angle of an LCD of the present invention without departing from the spirit or scope of the invention. Thus, it is intended that the present invention cover the modifications and variations of this invention provided they come within the scope of the appended claims and their equivalents.

What is claimed is:

1. A device for adjusting a mounting angle of a liquid crystal display (LCD) for a refrigerator comprising:

an LCD rotatably mounted in a cavity formed in a front surface of a door of a refrigerator by a hinge;

a motor provided behind the front surface of the door; and, a linkage connecting an output of the motor to the LCD, such that the LCD can be moved from an initial position: to an angled position wherein the LCD is angled relative to the front surface of the door, wherein the motor is provided in the cavity.

2. A device as claimed in claim 1, wherein the linkage includes:

a conversion gear which moves linearly in a vertical direction relative to the door;

and a link having a first end connected to the conversion gear and a second end connected to the LCD.

3. A device as claimed in claim 2, wherein the first end of the link is rotatably connected to the conversion gear and the second end of the link is rotatably connected to a lower portion of the LCD.

4. A device as claimed in claim 2, wherein the linkage further includes:

a driving gear transmitting a rotation from a shaft of the motor to the conversion gear to cause the conversion gear to move linearly in the vertical direction.

5. A device as claimed in claim 1, wherein the hinge extends in a horizontal direction relative to the door.

6. A device as claimed in claim 1, further comprising:

a switch provided on the front surface of the door for controlling operation of the motor.

7. The device as claimed in claim 1, further comprising a stopping part provided above the cavity for preventing interference by the door when the LCD is rotated and for limiting rotation of the LCD to a specific range of rotational positions.

8. The device of claim 1, wherein the linkage is provided in the cavity and behind the LCD.

9. A device for adjusting a mounting angle of a liquid crystal display (LCD) for a refrigerator comprising:

an LCD rotatably mounted in a cavity formed in a front surface of a door of a refrigerator by a hinge; and mounting angle adjusting means rearward of the LCD for rotating the LCD about the hinge, such that the LCD is angled relative to the front surface of the door of the refrigerator, wherein the mounting angle adjusting means are provided in the cavity.

10. A device for adjusting a mounting angle of a liquid crystal display (LCD) for a refrigerator comprising:

an LCD rotatable mounted in a cavity formed in a front surface of a door of a refrigerator by a hinge; and mounting angle adjusting means rearward of the LCD for rotating the LCD about the hinge, such that the LCD is angled relative to the front surface of the door of the refrigerator, wherein the mounting angle adjusting means includes;

a motor mounted on the door, movement conversion means for converting a rotating movement of a shaft of the motor into a linear movement, and supplementary movement conversion means provided between the movement conversion means and the LCD for converting the linear movement into a rotating movement.

* * * * *